(12) United States Patent
Zhang

(10) Patent No.: US 7,796,375 B2
(45) Date of Patent: Sep. 14, 2010

(54) BASEPAN ASSEMBLY FOR A METERING DEVICE

(75) Inventor: Fan Zhang, Suwanee, GA (US)

(73) Assignee: Siemens Industry, Inc., Alpharetta, GA (US)

(*) Notice: Subject to any disclaimer, the term of this patent is extended or adjusted under 35 U.S.C. 154(b) by 89 days.

(21) Appl. No.: 12/371,944

(22) Filed: Feb. 17, 2009

(65) Prior Publication Data

US 2009/0207559 A1    Aug. 20, 2009

Related U.S. Application Data

(60) Provisional application No. 61/029,646, filed on Feb. 19, 2008.

(51) Int. Cl.
*H02B 1/00* (2006.01)

(52) U.S. Cl. .................. 361/659; 361/657; 361/660; 361/664; 361/665; 361/669; 361/670; 361/671

(58) Field of Classification Search .............. None
See application file for complete search history.

(56) References Cited

U.S. PATENT DOCUMENTS

| | | | |
|---|---|---|---|
| 3,746,936 A | 7/1973 | Coffey | |
| 5,721,667 A * | 2/1998 | Rose | 361/627 |
| 6,012,937 A | 1/2000 | Campbell | |
| 6,421,229 B1 * | 7/2002 | Campbell et al. | 361/622 |
| 7,245,480 B2 * | 7/2007 | Dixon et al. | 361/634 |
| 7,295,427 B2 * | 11/2007 | Muhlberger et al. | 361/634 |
| 7,414,829 B2 * | 8/2008 | Dixon et al. | 361/673 |
| 2002/0080561 A1 | 6/2002 | Campbell | |
| 2008/0002339 A1 | 1/2008 | Dixon | |
| 2009/0251852 A1 * | 10/2009 | Zhang et al. | 361/660 |

* cited by examiner

*Primary Examiner*—Boris L Chervinsky
(74) *Attorney, Agent, or Firm*—Jose de la Rosa

(57) ABSTRACT

A basepan assembly for hook-on attachment onto a metering device is provided including a basepan support having at least two insert latches disposed at a first end and a side flange disposed at a second opposite end. A basepan body is provided being insertable onto said basepan support and including an inside wall configured to be attachable to a barrier of the metering device, as well as an outside wall, a bus stab chamber, and a hold-down insert configured to be attachable to the basepan body, the hold-down insert further having a side barrier. A top load stab having a first end affixable to the hold-down insert is provided and a bottom load stab insertable within said bus stab chamber is provided.

20 Claims, 5 Drawing Sheets

BASEPAN ASSEMBLY FOR A METERING DEVICE

CROSS-REFERENCE TO RELATED APPLICATIONS

This application claims the benefit of U.S. Provisional Application Ser. No. 61/029,646, filed on Feb. 19, 2008, which is incorporated herein by reference in its entirety.

BACKGROUND

1. Technical Field

This disclosure relates to basepans for metering devices, and more particularly, to a composite basepan and basepan support assembly for use in modular metering or meter combination devices.

2. Description of the Related Art

Utility companies transfer electrical power in three phases (A, B, and C phase) of alternating current (AC) power which are synchronized and offset from each other by 120 degrees. The three phase power is transferred over three wire lines, in addition to a ground or neutral wire, to transformers, which converts the power to lower distribution voltages. A main service panel then distributes single phase electrical power (AB, BC, or AC) to each tenant or customer.

In high-rise buildings, apartments, and some office complexes, utility companies may provide three phase electrical power through bus ways or cables to a service entrance which is connected to modular meter stacks (group metering) to distribute three phase electrical power to single phase meter sockets, and ultimately to the tenant.

After electricity consumption is measured through a watt-hour meter that is plugged in the meter socket when in service, the electric power is transferred to load terminals and then delivered to the composite basepan for tenant connection.

The installation of a meter device and basepan assembly can be a complex, time-consuming procedure. In addition, careful and solid attachment of the components, especially a basepan assembly, is imperative for safety reasons. Maintaining proper electrical seals (i.e., between the utility section and the load section) is also an important concern.

Accordingly, a basepan assembly which may be easily, safely and efficiently installed in modular metering or meter combination devices, is highly desirable.

SUMMARY OF THE INVENTION

According to one aspect of the present principles, a composite basepan for modular metering or meter combination devices and a hangable or 'hook-on' basepan support for same is provided.

Advantageously, a firm and robust composite basepan for a modular metering device is provided which may be easily and quickly installable. A basepan support device for the composite basepan is also provided adapted to be easily, quickly and securely attached within a meter enclosure. Fast and secure attachment of the basepan is accordingly enabled while minimizing the number of openings which must be made in the barrier within the meter enclosure, thus minimizing the number of openings in the barrier which need to be electrically sealed as per safety requirements. Furthermore, any openings in the barrier are self-sealed upon attachment and installation of a basepan assembly according to the present principles.

According to one aspect, the composite basepan may comprise a basepan body, two load stabs and a hold-down insert. The basepan body may include side supports and/or back hooks for attachment thereon of a circuit breaker or a lug kit, and includes a stab chamber and a locator for the bottom load stab. The hold-down insert includes latches for hooking onto the basepan body for 'sandwiching' the bottom load stab onto the basepan body when installed. The hold-down insert also features a stab chamber and a locator for the top load stab. The lock tab on the hold-down insert is hooked in the slot on the barrier where the load stabs are passed through for securing thereon. The positioning pillars on the basepan body are fitted into respective holes on the barrier, and the hook-on basepan support has locking tabs which are inserted through respective slots on the barrier, thus holding the basepan on the bottom and side to secure the basepan in position. A basepan assembly according to an aspect of the present principles provides interlocking components which provide a fast and easy assembly process for installing basepan assemblies in modular metering or meter combination devices.

According to one aspect of the present principles, a basepan assembly for a metering device is provided comprising a basepan support including at least two insert latches disposed at a first end and a side flange disposed at a second opposite end. A basepan body insertable onto said basepan support is provided comprising an inside wall configured to be attachable to a barrier of the metering device, an outside wall, a bus stab chamber, and a hold-down insert configured to be attachable to the basepan body, the hold-down insert further having a side barrier. A top load stab is provided having a first end affixable to the hold-down insert, and a bottom load stab insertable within said bus stab chamber is provided.

According to another aspect, a basepan assembly for a metering device is provided comprising a barrier wall for separating a utility section from a customer section in the metering device, the barrier including at least one load slot, at least one pillar hole and at least two insert slots. A basepan support is provided including at least two insert latches disposed at a first end and a side flange disposed at a second opposite end, said at least two insert latches being inserted into said at least two insert slots to latchedly engage the basepan support onto the barrier wall in the customer section. A basepan body fits onto said basepan support is provided comprising an inside wall attached to the barrier of the metering device, an outside wall, a bus stab chamber, and a hold-down insert, the hold-down insert further having a side barrier. A top load stab is provided having a first end inserted through said load slot and affixed to the hold-down insert. A bottom load stab is provided having a first end inserted through said load slot and placed within said bus stab chamber, wherein the hold-down insert is attached to the basepan body while sandwiching the bottom load stab between the hold-down insert and the basepan body.

According to yet another aspect, a basepan assembly for hook-on attachment to a metering device is provided comprising a barrier wall for separating a utility section from a customer section in the metering device, the barrier including at least one load slot and at least two insert slots. A basepan support is provided including at least two insert latches disposed at a first end and a side flange disposed at a second opposite end, said at least two insert latches being inserted into said at least two insert slots to latchedly engage the basepan support onto the barrier wall in the customer section. A basepan body fits onto said basepan support is provided comprising an inside wall attached to the barrier of the metering device, an outside wall, a bus stab chamber, and a hold-down insert, the hold-down insert further having a side barrier and a slot under the side barrier. A top load stab is provided having a first end inserted through said load slot and further inserted through the slot under the side barrier to latchedly affix the top load stab onto the hold-down insert. A bottom load stab is provided having a first end inserted through said load slot and placed within said bus stab chamber, wherein the hold-down insert is attached to the basepan body while sandwiching the bottom load stab between itself and the basepan body, and wherein the side barrier is mounted against and seals the load slot of the barrier wall.

These and other objects, features and advantages of the present invention will become apparent from the following detailed description of illustrative embodiments thereof, which is to be read in connection with the accompanying drawings.

BRIEF DESCRIPTION OF THE DRAWINGS

This disclosure will present in detail the following description of preferred embodiments with reference to the following figures wherein.

DETAILED DESCRIPTION OF PREFERRED EMBODIMENTS

The present invention will be described in terms of illustrative embodiments. It should be understood that the present invention is not limited to the details and description shown in these illustrative non-limiting examples and may be employed or practiced in various other ways. Further, the specific terminology used herein is for purposes of description and is not intended to be limiting in any way.

Thus, for example, it will be appreciated by those skilled in the art that the diagrams presented herein represent conceptual views of illustrative system components and/or mechanics embodying the principles of the invention.

Figure 1:
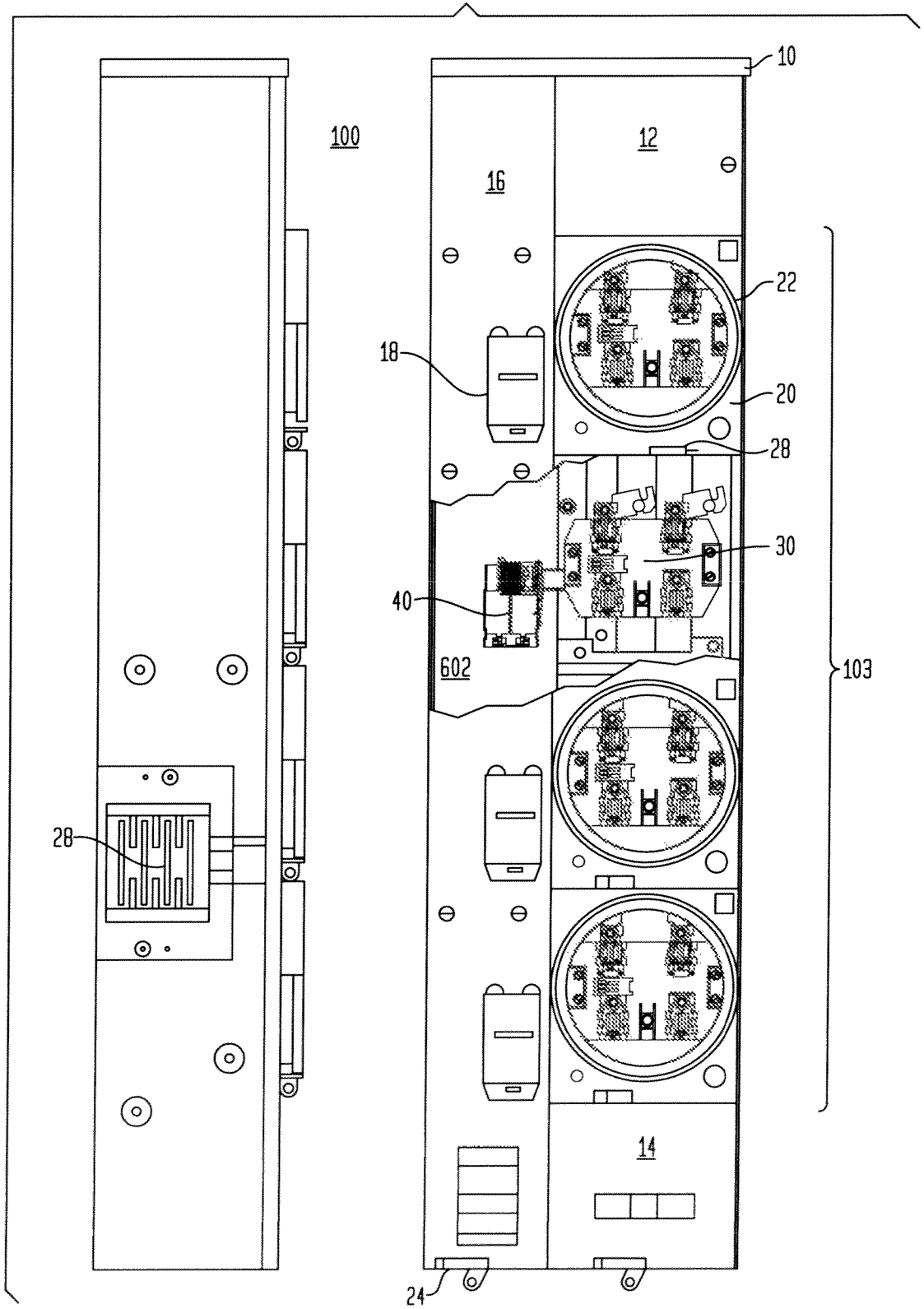
FIG. 1 depicts side and front views of an exemplary four meter position modular metering device according to an aspect of the present principles.

Referring now in specific detail to the drawings in which like reference numerals identify similar or identical elements throughout the several views, and initially to FIG. 1, side and front views of an exemplary four meter position modular metering device 100 according to an aspect of the present principles are shown. The four meter position modular metering device 100 includes an enclosure 10, an upper tenant cover 12, a lower tenant cover 14, a load tenant cover 16, a breaker cover 18, a meter cover 20 and enclosed electrical connections. The tenant covers 12/14/16 are fastened and latched onto the enclosure 10 via fasteners 24. FIG. 1 includes a partial cut away view in which a portion of the tenant cover 16 and meter cover 20 is removed, revealing load/customer section 602. Namely, beneath the tenant covers 12/14/16 and inside the enclosure 10, load wireways/load section 602 and breaker basepan assemblies 40 are provided for load tenant connections.

All meter covers 20 are configured to be individually removable or installable, and are sealed (e.g., via a latch 26 for a ringless type meter cover, or via a sealing ring for a ring-type meter cover). Each meter cover 20 has a meter opening 22 configured to receive a watt-hour meter. Meter sockets 30, with line and load connections, are laid under the meter openings 22 for plugging-in watt-hour meters. Line electrical power is fed to the modular metering device through cross feeder buses 28, and then electrical power is transferred through riser distribution buses to the meter sockets 30. Through watt-hour meters, electrical power is delivered from the load side of meter sockets 30 in the utility section 103 to basepan 40 stabs in the customer/tenant section 602. A barrier 100 separates the utility section 103 and customer section 602 in a metering device to protect the meter section 103 from unauthorized access. For example, the barrier 100 divides the enclosure 10 into two separate sections: a utility section (meter section 103) and a load tenant section 602 (encompassing the area beneath tenant covers 12, 14, 16.)

Figure 2:
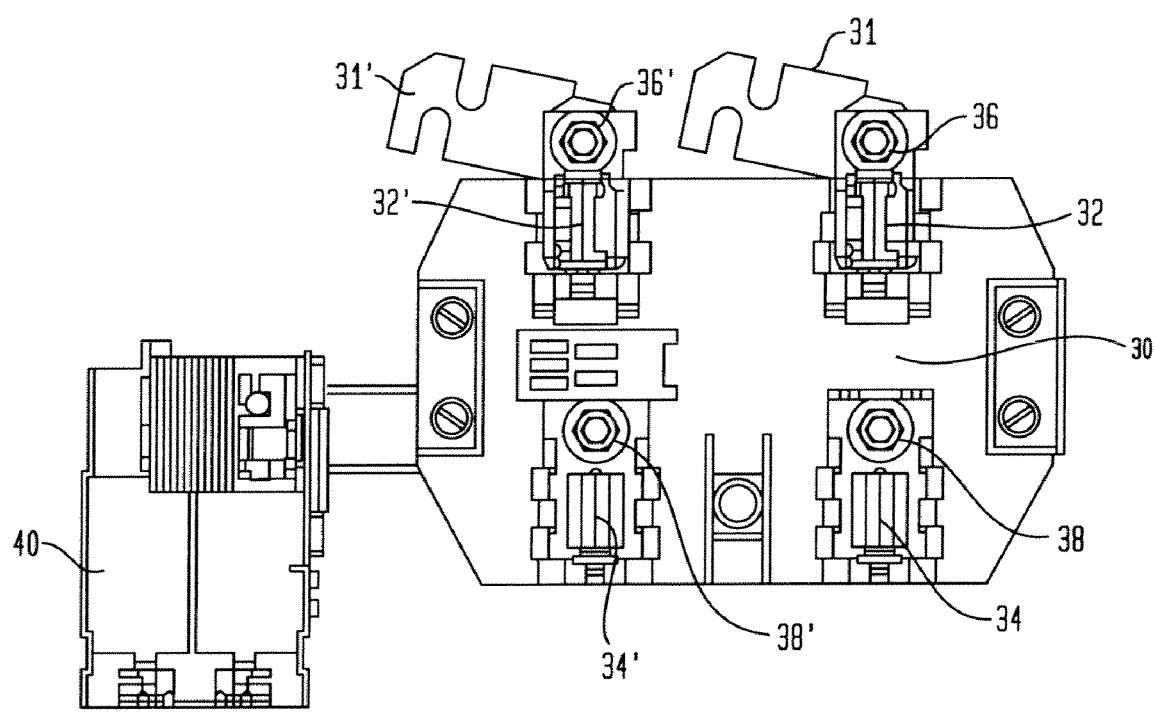
FIG. 2 is a front view of an exemplary single meter position module showing an attached basepan assembly according to an aspect of the present principles.

FIG. 2 is a front view of an exemplary single meter position module showing an attached basepan assembly 40 according to an aspect of the present principles. The meter socket 30 includes line straps 31/31', and basepan assembly 40. The line straps 31/31' lead electrical power to the line terminals 36/36' then to the line meter jaws 32/32'. After electricity consumption is measured through a watt-hour meter that is plugged in the meter socket when in service, the electric power is transferred to the load terminals 38/38' through the load meter jaws 34/34', and is then delivered to the composite basepan 40 through the load stabs 42/44 (shown in FIG. 3) for tenant connection.

Figure 3:
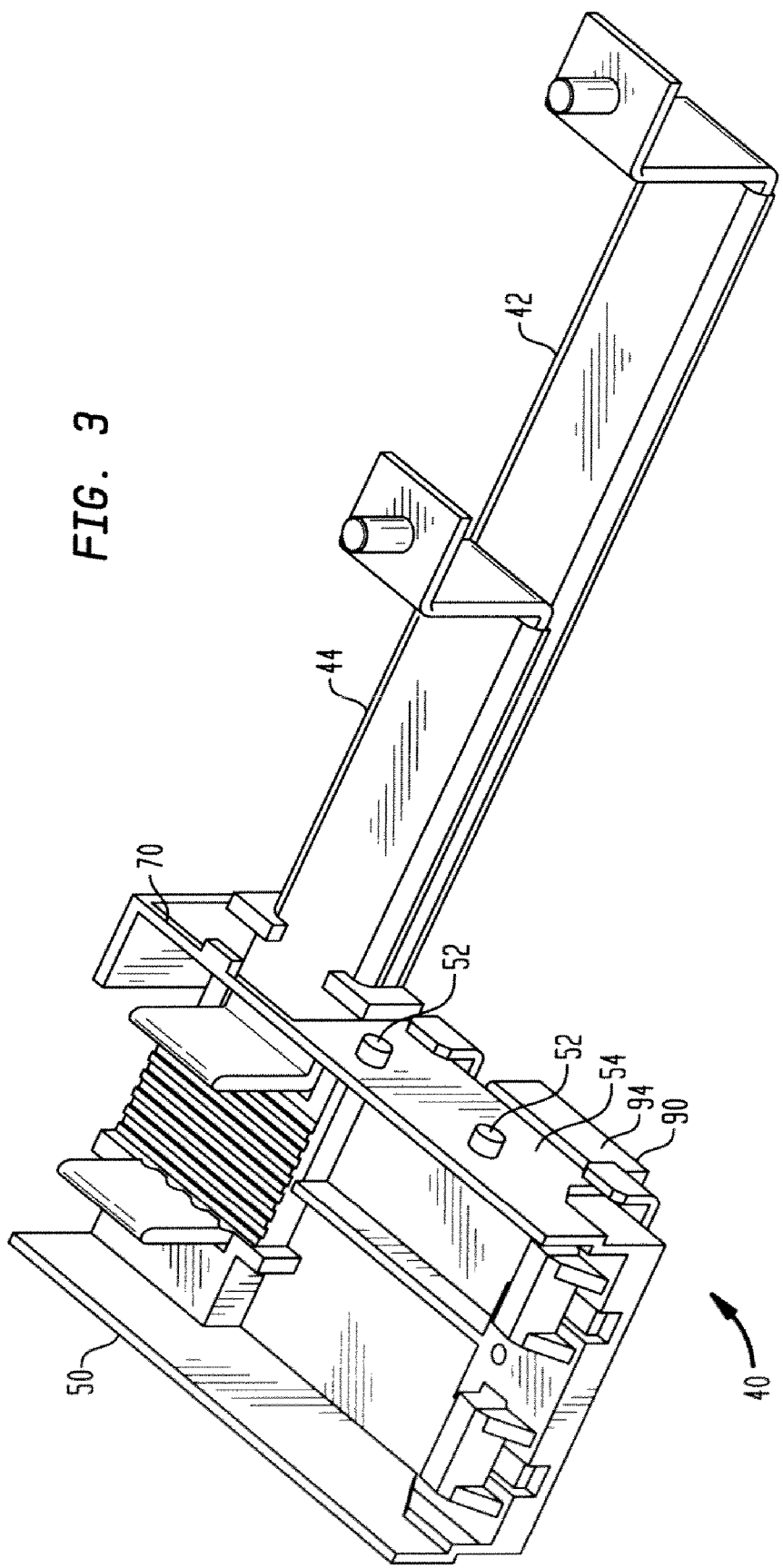
FIG. 3 is a front perspective view of an exemplary composite basepan assembly including a basepan support according to an aspect of the present principles.

FIG. 3 is a front perspective view of an exemplary composite basepan assembly 40 comprising a basepan body 50 attached onto a basepan support 90 according to an aspect of the present principles. The composite basepan assembly 40 comprises a basepan body 50 having an inside wall 54, a hold-down insert 70 and two load stabs 42/44, and a basepan support 90 attached thereon. During installation, the basepan body 50 is attached onto a barrier 100 (shown in FIG. 1) such that the inside wall 54 is pressed against the barrier 100. The load stabs 42/44 pass through the barrier 100 and connected to the load terminals 38/38' (shown in FIG. 2) on a meter socket 30.

Advantageously, the features of the basepan support 90 utilize the dimensions, mass and volume of the basepan body 50 to help hold the basepan assembly 40 on the customer side 602 of the barrier 100 without the need for, e.g., fasteners, screws or rivets. Namely, the basepan support 90 may be hooked onto a barrier 100, and the basepan base 50 may be snap fit thereon to the support 90. These parts accordingly are secured together and provide a platform on which to assemble other components, such as the load stabs 42/44 and the hold-down insert 70.

During installation of the basepan assembly 40, the main parts—the hook-on basepan support 90, the basepan body 50 and the hold-down insert 70—may be assembled directly at the customer section, while the load stabs 42/44 that have multiple bends may be fed from the utility section 103 through an opening 102 (shown in FIG. 5) in the barrier 100. Advantageously, this enables an easy assembly process for installation of the basepan assembly, with minimal openings needed in the barrier 100 which would thereafter need to be electrically sealed according to utility requirements.

Figure 4:
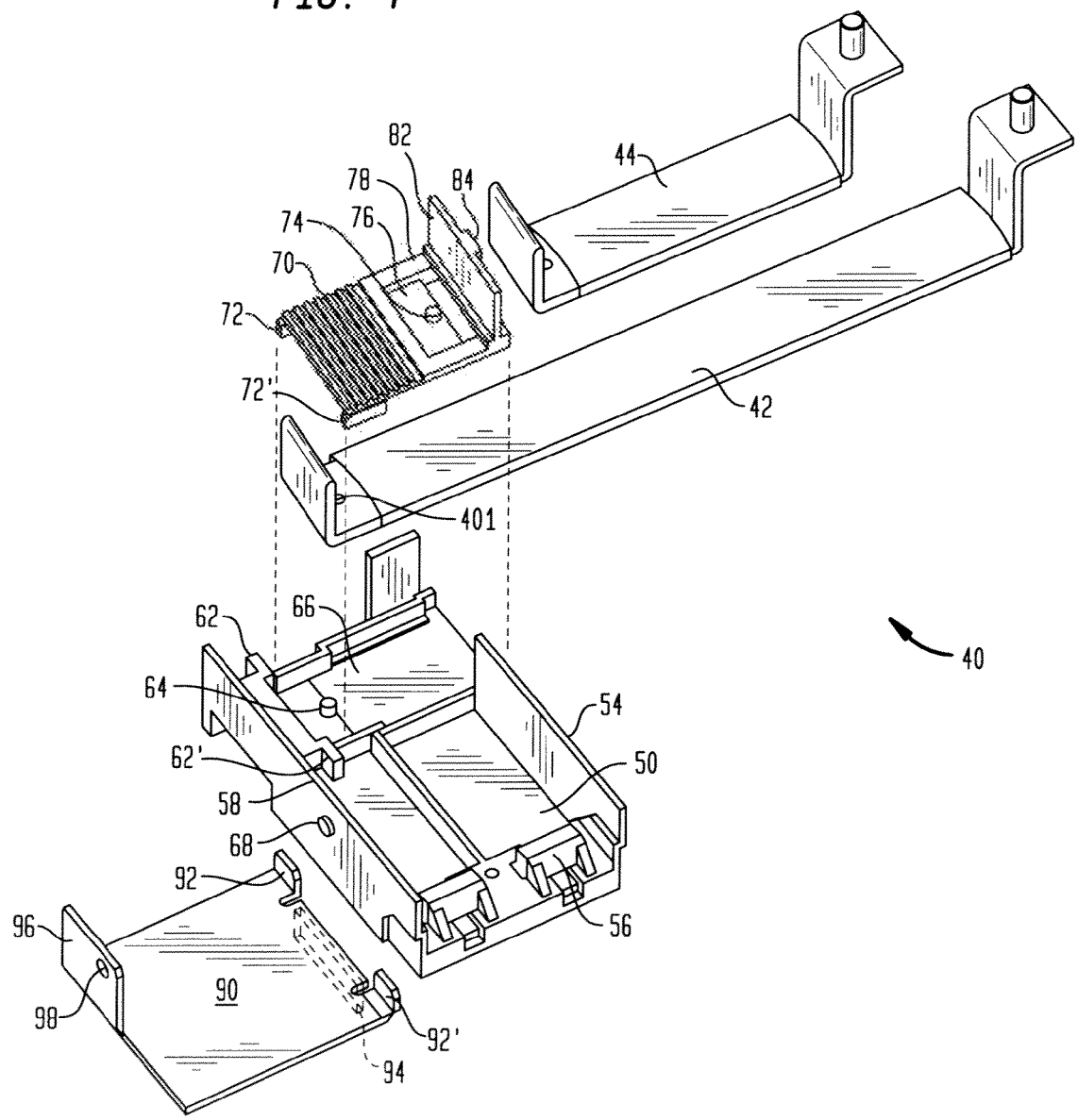
FIG. 4 is an exploded view of the exemplary composite basepan assembly including a basepan support of FIG. 3 according to an aspect of the present principles.

FIG. 4 is an exploded view of an exemplary composite basepan assembly 40 including a basepan support 90 of FIG. 3 according to an aspect of the present principles. To install the basepan assembly 40, a hook-on or 'hang-on' basepan support 90 is attached to the barrier 100 with at least two insert latches 92/92' (see also FIG. 5) which are inserted into the at least two insert slots 104/104' in the barrier 100 and hooked thereon (the latches 92/92' protruding on the utility side of the barrier 100). Accordingly, the basepan support 90 is latchedly engaged to the barrier wall 100 on the customer section side.

The at least one locator pillar 52 is matched up with at least one pillar hole 106 on the barrier 100 and then the basepan body 50 may be snapped onto the hook-on basepan support 90. Preferably, as shown herein, at least two locator pillars 52 (and thus two pillar holes 106) are provided. Moreover, preferably at least two insert latches 92/92' and at least two insert holes 106 are provided.

The at least one pillar 68 on the outside wall 58 of the basepan body 50 is lined up and inserted into the at least one hole 98 (FIG. 4) provided on the side flange 96 of the basepan support 90. It is noted that more than one pillar 68/hole 98 may be provided. When pillar 68 is inserted into the hole 98, the basepan body 50 and the hook-on basepan support 90 are accordingly attached onto the barrier 100 firmly. The bottom load stab 42 is inserted through the slot 102 (FIG. 5) on the barrier 100 from the utility section 103 and is laid in the bus stab chamber 66 (FIG. 4) on the basepan body 50. The load slot 102 may comprise, e.g., a rectangular shaped slot. A locator 64 in the bus stab chamber 66 meets with and is inserted into a hole 401 on the bottom load stab 42 to maintain the bottom load stab's alignment.

The basepan body 50 may include a hold-down insert piece 70 attached thereon, e.g., in the following manner. The hold-down insert 70 and the top load stab 44 may be attached to one another, with the hold-down insert 70 being pushed in from the customer section 602 and the top load stab 44 being fed from the utility section 103 through the load slot 102 (FIG. 5) on the barrier 100. One end of the top load stab 44 may be inserted through the slot 78 (located under the side barrier 82 of the hold-down insert 70, as shown in FIG. 4) and fitted on the locator 74 on a stab chamber 76. Accordingly, the top load stab 44 may be latchedly engaged with the hold-down insert 70. While the latch tabs 72/72' in front of the hold-down insert 70 are inserted into the locking loops 62/62' on the basepan body 50, the hold-down insert 70 and the top load stab 44 may be pressed together and downwards onto the stab chamber 66 of the basepan body 50, thus sandwiching and locking in the bottom load stab 42 in between the basepan body 50 and the hold-down insert 70.

A lock tab 84 (on top of the side barrier wall 82 of the hold-down insert 70) locks to the top edge of the rectangle slot 102 on the barrier 100. When secured, the bottom surface of the side barrier wall 82 contacts and is pressed against the top load stab 44. The side barrier 82 is preferably at least similar size and shape as the slot 102 such that when the basepan assembly is fully assembled and affixed onto the barrier 100, the side barrier 82 seals the load slot 102 of the barrier wall 100.

After the load stabs 42/44 are fastened to the load terminals 38/38' (FIG. 2) on a meter socket 30 in the utility section, the basepan assembly 40 and the hanging-on basepan support 90 are fully constrained and secured to the barrier 100. Inward biased hooks 56 (FIG. 4) may be provided on the basepan body 50 for attachment thereon of e.g., a circuit breaker or a lug kit.

Figure 5:
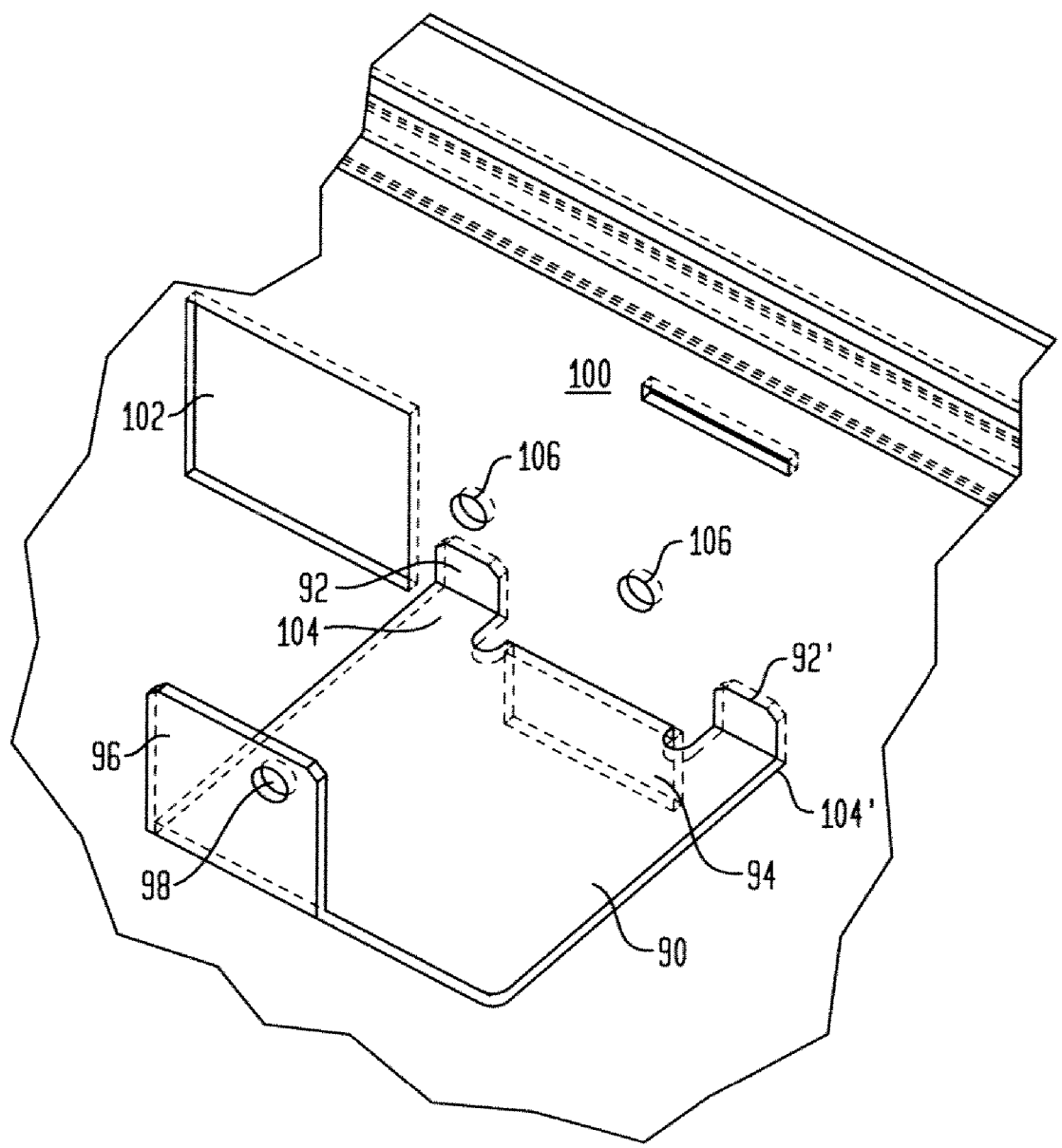
FIG. 5 shows a partial perspective view of an exemplary basepan support installed on a barrier according to an aspect of the present principles.

FIG. 5 shows a partial perspective view of an exemplary basepan support 90 installed on a barrier 100 according to an aspect of the present principles. Looking at the hidden profile (shown in hidden lines, here illustrated in FIG. 5 by the dotted lines) of the basepan support 90, the two upward biased insert latches 92/92' are inserted through the slots 104/104' on the barrier 100 and are thus secured against one side of the barrier 100 (the wall facing the utility section side 103), while the stopper tab 94 is pressed against the opposite side of the barrier 100 (i.e., the wall facing the customer section 602). The distance/space between the insert latches 92/92' and the stopper tab 94 comprises at least the thickness of the barrier 100 wall.

Accordingly, the hook-on basepan support 90 is effectively and securely attached to the barrier 100, whereupon a basepan body 50 is snap fit into the support 90 and locked on both sides therein by insertion of the at least two locator pillars 52 into the holes 106 on the barrier 100, and insertion of the at least one side pillar 68 into the hole 98 on the hook-on basepan support 90. Once the load stabs 42/44 are passed through the slot 102 on the barrier 100 and the basepan assembly 40 is installed, the side barrier wall 82 on a hold-down insert 70 effectively blocks and seals the slot 102.

Advantageously, a composite basepan assembly 40 is provided which is easy and quick to install on metering devices such as modular metering or meter combination devices, and achieves effective and secure attachment onto a barrier without fasteners, screws or rivets. According to another aspect, the basepan assembly minimizes and self-seals the openings required on the barriers for attachment thereon and for load stabs to pass through.

Having described preferred embodiments for a basepan assembly for a metering device (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A basepan assembly for a metering device comprising:
   a basepan support including at least two insert latches disposed at a first end and a side flange disposed at a second opposite end;
   a basepan body insertable onto said basepan support and comprising an inside wall configured to be attachable to a barrier of the metering device, an outside wall, a bus stab chamber, and a hold-down insert configured to be attachable to the basepan body, the hold-down insert further having a side barrier;
   a top load stab having a first end affixable to the hold-down insert; and
   a bottom load stab insertable within said bus stab chamber.

2. The basepan assembly of claim 1, wherein the at least two insert latches and the side flange protrude from the basepan support in a same direction.

3. The basepan assembly of claim 1, wherein the basepan support includes a stopper tab disposed proximate to and protruding in a same direction as said at least two insert latches.

4. The basepan assembly of claim 3, wherein a distance between said stopper tab and said at least two insert latches is at least a thickness of the barrier of the metering device.

5. The basepan assembly of claim 1, wherein said hold-down insert includes a slot under the side barrier for inserting said first end of the top load stab therethrough to affix the top load stab onto the hold-down insert.

6. The basepan assembly of claim 5, wherein the hold down insert is configured to be attached to the basepan body while sandwiching the bottom load stab between itself and the basepan body.

7. The basepan assembly of claim 1, wherein each of the inside wall of the basepan body, the outside wall of the basepan body and the bus stab chamber includes at least one pillar protruding therefrom.

8. The basepan assembly of claim 7, wherein the side flange of the basepan support includes at least one hole for receiving said at least one pillar of the outside wall and the bottom load stab includes at least one hole for receiving the at least one pillar in the bus stab chamber.

9. The basepan assembly of claim 1, wherein the hold-down insert includes at least two latch tabs, and the basepan body further includes at least two locking loops configured to be attachable to said at least two latch tabs.

10. A basepan assembly for a metering device comprising:
- a barrier wall for separating a utility section from a customer section in the metering device, the barrier including at least one load slot, at least one pillar hole and at least two insert slots;
- a basepan support including at least two insert latches disposed at a first end and a side flange disposed at a second opposite end, said at least two insert latches being inserted into said at least two insert slots to latchedly engage the basepan support onto the barrier wall in the customer section;
- a basepan body fitted onto said basepan support and comprising an inside wall attached to the barrier of the metering device, an outside wall, a bus stab chamber, and a hold-down insert, the hold-down insert further having a side barrier;
- a top load stab having a first end inserted through said load slot and affixed to the hold-down insert; and
- a bottom load stab having a first end inserted through said load slot and placed within said bus stab chamber, wherein the hold-down insert is attached to the basepan body while sandwiching the bottom load stab between the hold-down insert and the basepan body.

11. The basepan assembly of claim 10, wherein the at least two insert latches and the side flange protrude from the basepan support in a same direction.

12. The basepan assembly of claim 10, wherein the basepan support includes a stopper tab disposed proximate to and protruding in a same direction as said at least two insert latches.

13. The basepan assembly of claim 12, wherein a distance between said stopper tab and said at least two insert latches is at least a thickness of the barrier of the metering device.

14. The basepan assembly of claim 10, wherein said hold-down insert includes a slot under the side barrier for inserting said first end of the top load stab therethrough to affix the top load stab onto the hold-down insert.

15. The basepan assembly of claim 14, wherein each of the inside wall of the basepan body, the outside wall of the basepan body and the bus stab chamber includes at least one pillar protruding there from.

16. The basepan assembly of claim 15, wherein the side flange of the basepan support includes at least one hole for receiving said at least one pillar of the outside wall, the bottom load stab includes at least one hole for receiving the at least one pillar in the bus stab chamber, and the barrier includes at least one pillar hole for receiving the at least one pillar of the inside wall.

17. The basepan assembly of claim 10, wherein the basepan body further includes at least two locking loops and the hold-down insert includes at least two latch tabs, wherein the at least two locking loops are attached to said at least two latch tabs for attaching the hold-down insert to the basepan body.

18. The basepan assembly of claim 10, wherein the side barrier is mounted against and seals the load slot of the barrier wall.

19. A basepan assembly for hook-on attachment to a metering device comprising:
- a barrier wall for separating a utility section from a customer section in the metering device, the barrier including at least one load slot and at least two insert slots;
- a basepan support including at least two insert latches disposed at a first end and a side flange disposed at a second opposite end, said at least two insert latches being inserted into said at least two insert slots to latchedly engage the basepan support onto the barrier wall in the customer section;
- a basepan body fitted onto said basepan support and comprising an inside wall attached to the barrier of the metering device, an outside wall, a bus stab chamber, and a hold-down insert, the hold-down insert further having a side barrier and a slot under the side barrier;
- a top load stab having a first end inserted through said load slot and further inserted through the slot under the side barrier to latchedly affix the top load stab onto the hold-down insert; and
- a bottom load stab having a first end inserted through said load slot and placed within said bus stab chamber, wherein the hold-down insert is attached to the basepan body while sandwiching the bottom load stab between itself and the basepan body, and wherein the side barrier is mounted against and seals the load slot of the barrier wall.

20. The basepan assembly of claim 19, wherein the basepan support includes a stopper tab disposed proximate to and protruding in a same direction as said at least two insert latches, wherein a distance between said stopper tab and said at least two insert latches is at least a thickness of the barrier of the metering device.

* * * * *